United States Patent
Asano et al.

(10) Patent No.: US 10,343,459 B2
(45) Date of Patent: Jul. 9, 2019

(54) PNEUMATIC TIRE (71) Applicant: SUMITOMO RUBBER INDUSTRIES, LTD., Kobe-shi, Hyogo (JP)

(72) Inventors: Kazuo Asano, Kobe (JP); Yasuhiro Kubota, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 197 days.

(21) Appl. No.: 15/100,514

(22) PCT Filed: Jan. 6, 2015

(86) PCT No.: PCT/JP2015/050086
§ 371 (c)(1),
(2) Date: May 31, 2016

(87) PCT Pub. No.: WO2015/105084
PCT Pub. Date: Jul. 16, 2015

(65) Prior Publication Data
US 2016/0297246 A1    Oct. 13, 2016

(30) Foreign Application Priority Data
Jan. 9, 2014   (JP) .................................. 2014-002481

(51) Int. Cl.
*B60C 9/20* (2006.01)
*B60C 11/00* (2006.01)
*B60C 9/22* (2006.01)

(52) U.S. Cl.
CPC .............. *B60C 9/20* (2013.01); *B60C 9/2009* (2013.01); *B60C 9/22* (2013.01); *B60C 11/00* (2013.01); *B60C 2009/209* (2013.01); *B60C 2009/2019* (2013.01); *B60C 2009/2048* (2013.01); *B60C 2009/2074* (2013.01); *B60C 2009/2276* (2013.01); *Y02T 10/862* (2013.01)

(58) Field of Classification Search
CPC ............. B60C 11/00; B60C 2009/2019; B60C 2009/2048; B60C 2009/2074;
(Continued)

(56) References Cited

U.S. PATENT DOCUMENTS

| 6,568,445 | B1 | 5/2003 | Kojima |
| 2013/0168000 | A1 | 7/2013 | Kuwayama |

(Continued)

FOREIGN PATENT DOCUMENTS

| EP | 0 661 180 A1 | 7/1995 |
| EP | 1 203 672 A2 | 5/2002 |

(Continued)

OTHER PUBLICATIONS

JP2001039113A—Machine Translation (Year: 2001).*
(Continued)

*Primary Examiner* — Matthew J Daniels
*Assistant Examiner* — Yunju Kim
(74) *Attorney, Agent, or Firm* — Birch, Stewart, Kolasch & Birch, LLP (57) ABSTRACT

[Object] A pneumatic tire that allows reduction of the occurrence of a TGC and, at the same time, allows reduction of rolling resistance, is provided.
[Solution] The tire 12 includes a band 26 disposed radially inward of a tread 14, and a belt 24 disposed radially inward of the band 26. The band 26 includes a cord that is helically wound and extends substantially in a circumferential direction. The belt 24 includes an inner layer 24a, and an outer layer 24b that is layered over the inner layer 24a and disposed radially outward of the inner layer 24a. The inner layer 24a and the outer layer 24b each include multiple cords aligned with each other. The cords in the inner layer 24a and the cords in the outer layer 24b are inclined relative to an equator plane. A direction in which the cords in the inner (Continued)

layer 24a are inclined relative to the equator plane is opposite to a direction in which the cords in the outer layer 24b are inclined relative to the equator plane. Absolute values of inclination angles of the cords in the inner layer 24a and the cords in the outer layer 24b relative to the equator plane are greater than or equal to 35°, and not greater than 55°.

3 Claims, 6 Drawing Sheets

(58) Field of Classification Search
CPC ...... B60C 2009/209; B60C 2009/2276; B60C 9/20; B60C 9/2009; B60C 9/22; B60C 3/04; Y02T 10/862
USPC .................................................. 152/527, 454
See application file for complete search history.

(56) References Cited

U.S. PATENT DOCUMENTS

| | | | |
|---|---|---|---|
| 2014/0299247 A1* | 10/2014 | Hasegawa | B60C 11/0083 152/454 |
| 2015/0314647 A1* | 11/2015 | Kakizawa | B60C 9/20 152/527 |
| 2016/0193874 A1* | 7/2016 | Asano | B60C 9/2204 152/454 |

FOREIGN PATENT DOCUMENTS

| | | |
|---|---|---|
| EP | 2 082 901 A | 7/2009 |
| EP | 2 682 279 A1 | 1/2014 |
| JP | 9-207516 A | 8/1997 |
| JP | 2001-39113 A | 2/2001 |
| JP | 2013-95326 A | 5/2013 |
| JP | 2013-107518 A | 6/2013 |
| WO | WO 2011/161854 A1 | 12/2011 |

OTHER PUBLICATIONS

R. A. Fleming, Tire Reinforcement and Tire Performance, 1979 (Year: 1979).*
International Search Report, issued in PCT/JP2015/050086, PCT/ISA/210, dated Apr. 14, 2015.
Written Opinion of the International Searching Authority, issued in PCT/JP2015/050086, PCT/ISA/237, dated Apr. 14, 2015.

* cited by examiner

PNEUMATIC TIRE

TECHNICAL FIELD

The present invention relates to pneumatic tires. More particularly, the present invention relates to improvement in tire belts.

BACKGROUND ART

In recent years, in particular, reduction of fuel consumption of vehicles is highly required in consideration of environment. Tires affect the fuel efficiency of vehicles, and therefore, a "low fuel consumption tire" that contributes to reduction in fuel consumption is under development.

In order to reduce fuel consumption by means of tires, it is important to reduce the rolling resistance of the tires. Among the factors of generation of the rolling resistance of a tire are an energy loss caused by the deformation of the tire during rolling, an energy loss caused by the friction between the tire and the road surface, and the like. Of the parts of a tire, these losses are largest in a tread. For typical tires for passenger cars, the losses at the tread account for about 40% of the overall losses. Decrease in the losses at the tread may contribute significantly to reduction in rolling resistance. In order to reduce an energy loss at the tread, it is necessary to minimize the deformation of the tread of a tire during rolling.

Figure 6:
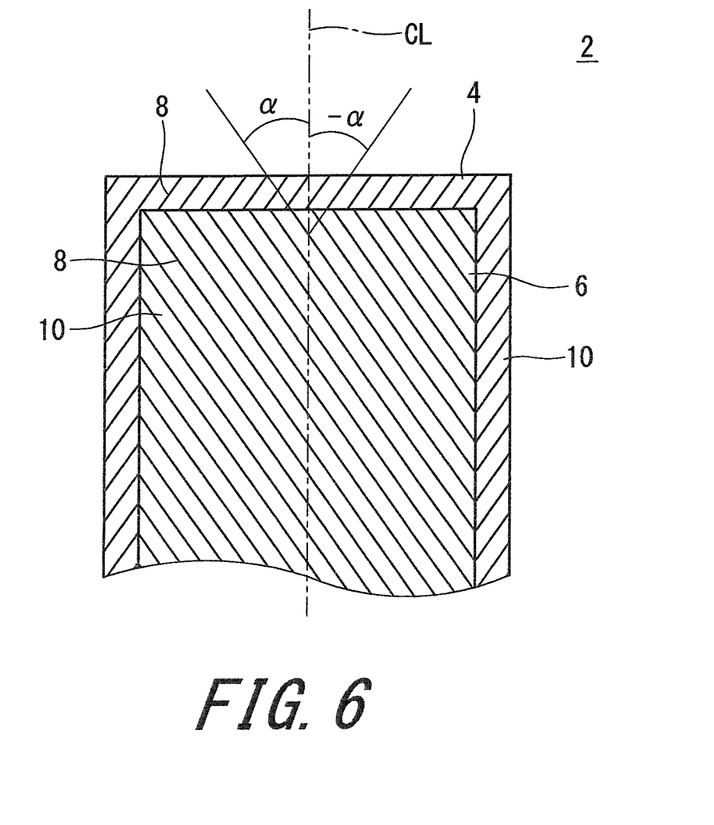
FIG. 6 is a schematic diagram showing a structure of a belt.

A pneumatic tire includes a belt for reinforcing a carcass. The belt typically includes an inner layer and an outer layer. FIG. 6 shows a part of a belt 2 including an inner layer 4 and an outer layer 6. In FIG. 6, the up-down direction represents the circumferential direction of the tire, the left-right direction represents the axial direction of the tire, and the direction perpendicular to the drawing sheet represents the radial direction of the tire. In FIG. 6, an alternate long and short dash line CL represents an equator plane of the tire.

The inner layer 4 and the outer layer 6 each include multiple cords 8 aligned with each other, and a topping rubber 10. Each cord 8 is inclined relative to the equator plane of the tire. As shown in FIG. 6, the inclination angle of each cord 8 in the inner layer 4 relative to the equator plane and the inclination angle of each cord 8 in the outer layer 6 relative to the equator plane, represent values in opposite directions, respectively. The absolute value of the inclination angle of each cord 8 in the inner layer 4 relative to the equator plane is equal to the absolute value of the inclination angle of each cord 8 in the outer layer 6 relative to the equator plane. In the description herein, the absolute value is represented by α. Typically, the absolute value α is small. Typically, the absolute value α is less than or equal to 35°. The main reasons therefor may be as follows.

(1) The stiffness of the tread in the circumferential direction can be increased by decreasing the absolute value α. As a result, the deformation of the tread during rolling of the tire is reduced.

(2) It is known that the profile of a tread of a tire having a small absolute value α is flatter than the profile of a tread of a tire having a large absolute value α. Based thereon, the deformation of the tread during rolling of the tire can be reduced.

(3) Increase of the absolute value α leads to decrease of the stiffness of the tread in the circumferential direction. Therefore, when the tire is inflated with air, the "projection" of the tread is likely to occur. This may lead to occurrence of a crack in the groove bottom of the tread (referred to as a tread groove crack, which is hereinafter represented as TGC).

As described above, conventionally, it is generally believed that if the absolute values α of the inclination angles of the cords in the inner layer and the cords in the outer layer relative to the equator plane are decreased, the deformation of the tread is reduced, so that the rolling resistance of the tire can be reduced. Moreover, the reduction in the absolute value α also contributes to reduction in the occurrence of a TGC. An exemplary tire having a belt in which the absolute value α is small is disclosed in JP2013-107518.

CITATION LIST

Patent Literature

Patent Literature 1: JP2013-107518

SUMMARY OF THE INVENTION

Problems to be Solved by the Invention

Since reduction of fuel consumption of vehicles is highly required, further reduction in the rolling resistance of tires is required. In addition, reduction in the occurrence of a TGC is required in order to maintain the durability of tires.

An object of the present invention is to provide a pneumatic tire in which the occurrence of a TGC is reduced while the rolling resistance is reduced.

Solution to the Problems

A pneumatic tire according to the present invention includes: a tread having an outer surface that forms a tread surface; a band disposed radially inward of the tread; and a belt disposed radially inward of the band. The band includes a cord that is helically wound and extends substantially in a circumferential direction. The belt includes an inner layer, and an outer layer that is layered over the inner layer and disposed radially outward of the inner layer. The inner layer and the outer layer each include multiple cords aligned with each other. The cords in the inner layer and the cords in the outer layer are inclined relative to an equator plane. A direction in which the cords in the inner layer are inclined relative to the equator plane is opposite to a direction in which the cords in the outer layer are inclined relative to the equator plane. Absolute values of inclination angles of the cords in the inner layer and the cords in the outer layer relative to the equator plane are greater than or equal to 35°, and not greater than 55°.

Preferably, a tensile stiffness Rt per unit width of each of the inner layer and the outer layer in a direction in which the cords extend is measured when a tensile strain in the cords in the inner layer and the outer layer is between 0.4% and 1.0%, and the tensile stiffness Rt is greater than or equal to 14 kN/mm, and not greater than 20 kN/mm.

Preferably, a tensile stiffness Rd per unit width of the band in a direction in which the cord extends is measured when a tensile strain in the cord of the band is between 3% and 5%, and the tensile stiffness Rd is greater than or equal to 1.6 kN/mm, and not greater than 2.5 kN/mm.

Preferably, the belt has a Poisson's ratio that is less than or equal to 1.9.

Another pneumatic tire according to the present invention includes: a tread having an outer surface that forms a tread surface; a band disposed radially inward of the tread; and a belt disposed radially inward of the band. The band includes a cord that is helically wound and extends substantially in a circumferential direction. The belt includes an inner layer, and an outer layer that is layered over the inner layer and disposed radially outward of the inner layer. The inner layer and the outer layer each include multiple cords aligned with each other. The cords in the inner layer and the cords in the outer layer are inclined relative to an equator plane. A direction in which the cords in the inner layer are inclined relative to the equator plane is opposite to a direction in which the cords in the outer layer are inclined relative to the equator plane. The belt has a Poisson's ratio that is less than or equal to 1.9.

Advantageous Effects of the Invention

The inventors of the present invention have specifically studied the structures of the belt and the band in order to further reduce the rolling resistance. As a result, the inventors of the present invention have found that, contrary to the traditional belief, when the absolute values α of the inclination angles of the cords in the inner layer and the cords in the outer layer relative to the equator plane are greater than or equal to 35°, and not greater than 55°, the deformation of the tread during rolling of the tire is reduced. In the tire according to the present invention, the absolute value α is greater than or equal to 35°, and not greater than 55°. In this tire, the rolling resistance is reduced. This tire further includes the band radially outward of the belt. The band includes a cord that is helically wound and extends substantially in the circumferential direction. Because of the band, even when the absolute values α of the inclination angles are greater than or equal to 35°, and not greater than 55°, the projection of the tread is reduced. This tire allows reduction of the occurrence of a TGC. This tire allows reduction of the occurrence of a TGC, and, at the same time, allows reduction of the rolling resistance.

BRIEF DESCRIPTION OF THE DRAWINGS

FIG. 3 (a) of FIG. 3 shows the result of analysis of a strain in a tread in a crown portion, (b) of FIG. 3 shows the result of analysis of a strain in a topping rubber of the belt in the crown portion, (c) of FIG. 3 shows the result of analysis of a strain in a tread in a shoulder portion, and (d) of FIG. 3 shows the result of analysis of a strain in a topping rubber of the belt in the shoulder portion.

DESCRIPTION OF EMBODIMENTS

The following will describe in detail the present invention based on preferred embodiments with reference where appropriate to the accompanying drawings.

Figure 1:
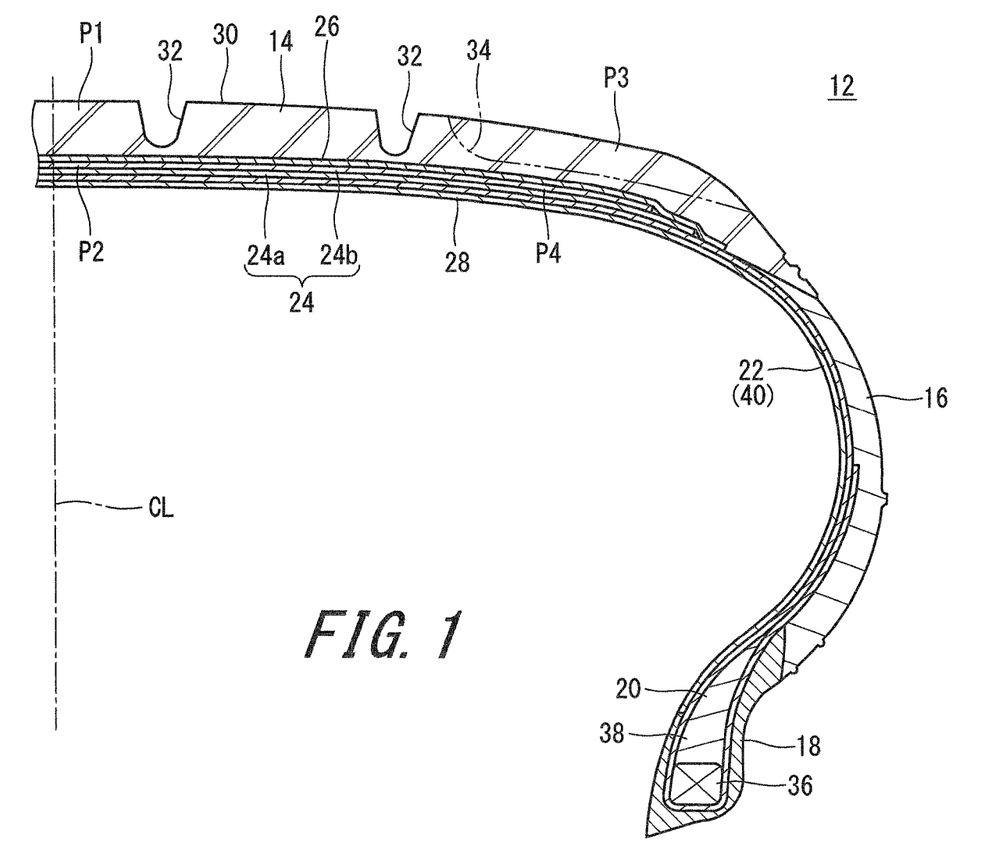
FIG. 1 is a cross-sectional view showing a part of a tire according to an embodiment of the present invention.

FIG. 1 illustrates a pneumatic tire 12. In FIG. 1, the up-down direction represents the radial direction of the tire 12, the left-right direction represents the axial direction of the tire 12, and the direction perpendicular to the drawing sheet represents the circumferential direction of the tire 12. In FIG. 1, an alternate long and short dash line CL represents the equator plane of the tire 12. The shape of the tire 12, excluding the tread pattern, is symmetric about the equator plane.

The tire 12 includes a tread 14, sidewalls 16, clinches 18, beads 20, a carcass 22, a belt 24, a band 26, and an inner liner 28. The tire 12 is of the tubeless type. The tire 12 is mounted to a passenger car.

The tread 14 has a shape which projects outward in the radial direction. The tread 14 has a tread surface 30 which comes into contact with the road surface. The tread surface 30 has main grooves 32 extending almost in the circumferential direction and lug grooves 34 extending almost in the axial direction. The main grooves 32 and the lug grooves 34 form a tread pattern. The tread 14 is formed of a crosslinked rubber which is excellent in wear resistance, heat resistance, and grip performance.

Each sidewall 16 extends from an end of the tread 14 almost inward in the radial direction. The sidewall 16 is formed of a crosslinked rubber which is excellent in cut resistance and weather resistance. The sidewalls 16 prevent damage of the carcass 22.

The clinch 18 is disposed almost inward of the sidewall 16 in the radial direction. The clinch 18 is disposed axially outward of the bead 20 and the carcass 22. The clinch 18 is formed of a crosslinked rubber which is excellent in wear resistance. The clinch 18 comes into contact with a flange of a rim.

The beads 20 are disposed axially inward of the clinches 18. Each bead 20 includes a core 36 and an apex 38 which extends radially outward from the core 36. The core 36 is ring-shaped, and includes a wound non-stretchable wire. A typical material for the wire is steel.

The apex 38 is tapered radially outward. The apex 38 is formed of a crosslinked rubber which has high hardness.

The carcass 22 includes a carcass ply 40. The carcass ply 40 is extended on and between the beads 20 on both sides, along the tread 14 and the sidewalls 16. The carcass ply 40 is turned up around the core 36 from the inner side toward the outer side in the axial direction. By the turning-up of the carcass ply 40, the carcass ply 40 includes a main portion and turned-up portions.

Although not shown, the carcass ply 40 includes multiple cords aligned with each other, and a topping rubber. The absolute value of an angle of each cord relative to the equator plane ranges from 75° to 90°. In other words, the carcass 22 forms a radial structure. The cord is formed of an organic fiber. Preferable examples of the organic fiber include polyester fibers, nylon fibers, rayon fibers, polyethylene naphthalate fibers, and aramid fibers. The carcass 22 may include two or more plies.

The belt 24 is disposed radially inward of the tread 14. The belt 24 is layered over the carcass 22. The belt 24 reinforces the carcass 22. The belt 24 includes an inner layer 24a and an outer layer 24b. The inner layer 24a and the outer layer 24b each include multiple cords aligned with each other, and a topping rubber. Each cord is inclined relative to the equator plane. The direction in which the cords in the inner layer 24a are inclined relative to the equator plane is opposite to the direction in which the cords in the outer layer 24b are inclined relative to the equator plane. The difference between: the absolute value of the inclination angle of the cords in the inner layer 24a relative to the equator plane; and the absolute value of the inclination angle of the cords in the outer layer 24b relative to the equator plane is less than or equal to 2°. In other words, these absolute values are equal to each other. In the description herein, the absolute value is represented by a. The absolute value α of the inclination angle is greater than or equal to 35°, and not greater than 55°. In the tire 12, a material for the cords is steel. The cords may be formed using an organic fiber. The belt 24 may include three or more layers.

The band 26 is disposed radially inward of the tread 14. The band 26 is disposed radially outward of the belt 24. The band 26 is layered over the belt 24. The band 26 includes a cord and a topping rubber. The cord is helically wound. The band 26 has a so-called jointless structure. The cord extends substantially in the circumferential direction. The angle of the cord relative to the circumferential direction is less than or equal to 5°, and more preferably less than or equal to 2°. The band 26 may contribute to the stiffness of the tire 12. The band 26 may reduce the influence of a centrifugal force acting during traveling. This tire 12 is excellent in high-speed stability. A material for the cord is steel. The cord may be formed using an organic fiber. Preferable examples of the organic fiber include nylon fibers, polyester fibers, rayon fibers, polyethylene naphthalate fibers, and aramid fibers.

The inner liner 28 is disposed inward of the carcass 22. The inner liner 28 is joined to the inner surface of the carcass 22. The inner liner 28 is formed of a crosslinked rubber. The inner liner 28 is formed of a rubber which is excellent in airtightness. A typical base rubber for the inner liner 28 is isobutylene-isoprene-rubber or halogenated isobutylene-isoprene-rubber. The inner liner 28 maintains the internal pressure of the tire 12.

Advantageous effects of the present invention will be described below.

As described above, conventionally, it is generally believed that if the absolute values α of the inclination angles of the cords in the inner layer and the cords in the outer layer relative to the equator plane are decreased, the rolling resistance of the tire can be reduced. The inventors of the present invention have specifically studied the structures of the belt and the band in order to further reduce the rolling resistance. As a result, the inventors of the present invention have found that, contrary to the traditional belief, the rolling resistance decreases when the absolute value α is greater than or equal to 35°, and not greater than 55°. An example of the result of the study of the cause thereof is shown in FIG. 2.

Figure 2:
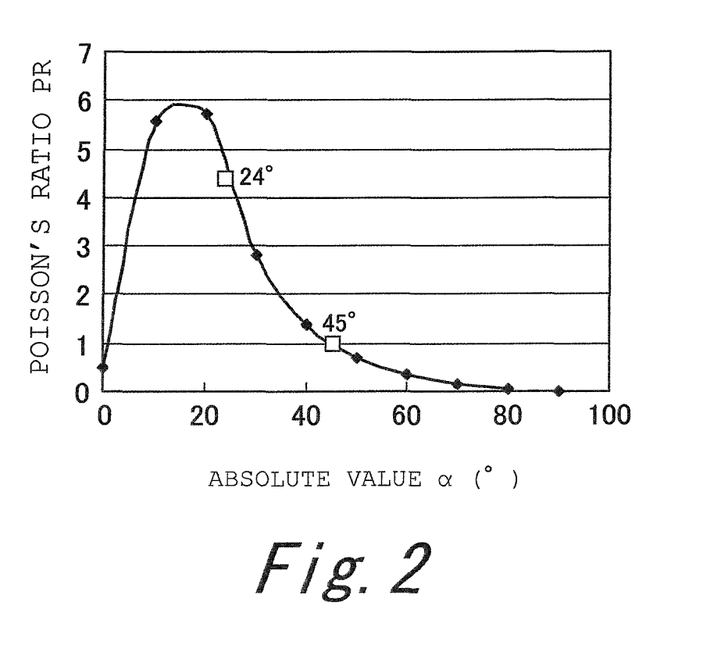
FIG. 2 is a diagram showing a relationship between an absolute value α of an inclination angle of cords in a belt and a Poisson's ratio of the belt.

FIG. 2 shows the result of calculation of a relationship between the absolute value α of the inclination angles of the cords in the inner layer and the outer layer relative to the equator plane and the "Poisson's ratio PR" of the belt having these cords, on the basis of a lamination theory. Here, the Poisson's ratio PR of the belt refers to the ratio of an axial strain to a circumferential strain which is obtained when a tensile force is applied to the belt in the circumferential direction. The Poisson's ratio PR of the belt is increased when the absolute value α of the inclination angle is between 10° and 35°, and particularly, is maximum when the absolute value α is about 20°. The Poisson's ratio PR of the belt is reduced when the absolute value α is greater than or equal to 35°. This indicates that when the ground contact portion of a tire is deformed in the circumferential direction, a strain in the vicinity of an axial end of the belt is less in a tire including the belt in which the absolute value α is greater than or equal to 35°, than in a tire including the belt in which the absolute value α is between 10° and 35°. Thus, the deformation of the shoulder portion of the tread during rolling of the tire, is reduced. This contributes to reduction in the rolling resistance.

In the tire 12 according to the present invention, the absolute value α of the inclination angles of the cords in the inner layer 24a and the outer layer 24b relative to the equator plane is greater than or equal to 35°, and not greater than 55°. The Poisson's ratio PR of the belt 24 having the inner layer 24a and the outer layer 24b is small. In this tire 12, the deformation of the shoulder portion of the tread 14 is reduced.

For a conventional tire in which the absolute value α of the inclination angle is 24° and the tire 12 according to the present invention in which the absolute value α of the inclination angle is 45°, a strain of the rubber in the width direction during rolling of the tire was actually calculated using the finite element method (FEM). The strain was calculated at a point (a point P1 in FIG. 1) on the tread in the crown portion, a point (a point P2 in FIG. 1) on the topping rubber of the belt in the crown portion, a point (a point P3 in FIG. 1) on the tread in the shoulder portion, and a point (a point P4 in FIG. 1) on the topping rubber of the belt in the shoulder portion. The calculation was conducted under the following conditions.

Figure 3:
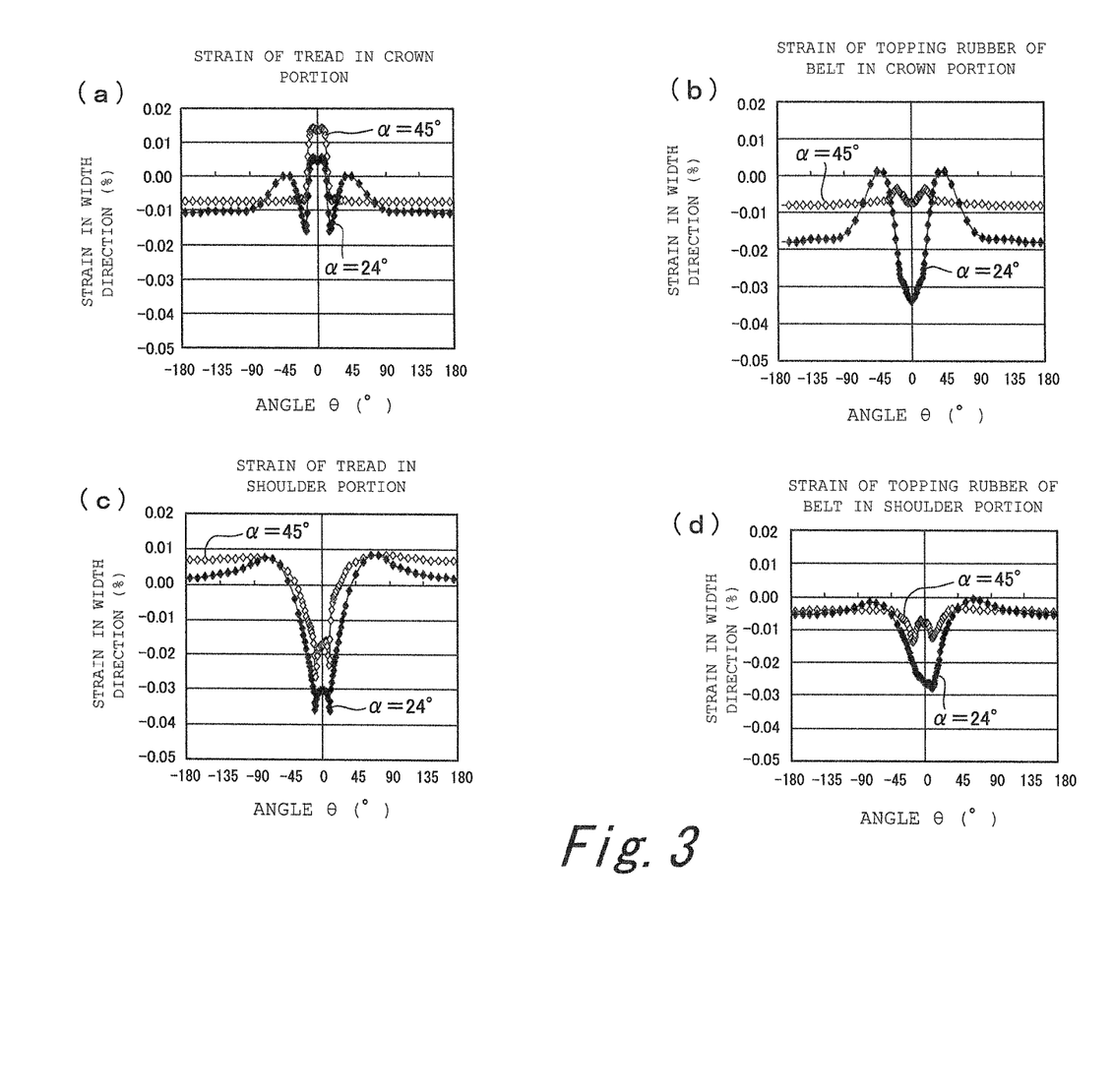
Figure 4:
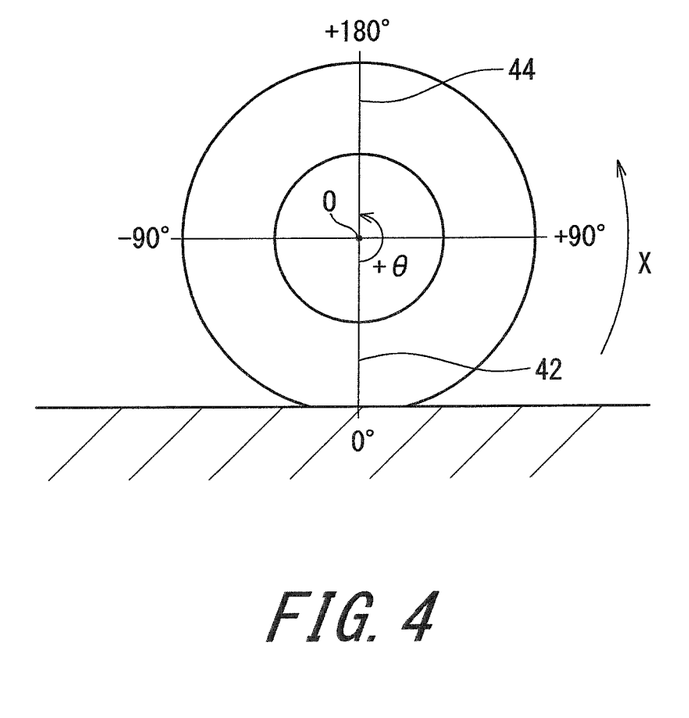
FIG. 4 is a schematic diagram showing the definition of an angle θ used in the analysis of the strains of the tire in FIG. 3.

Tire size: 215/50R17
Rim size: 6.5×17
Tire internal pressure: 200 kPa
Vertical load: 4.8 kN The result of the calculation are shown in (a) to (d) of FIG. 3. An angle θ in FIG. 3 is defined in FIG. 4. In FIG. 4, an arrow X indicates the direction in which this tire rotates. Specifically, when the perpendicular drawn from the axis O of rotation of the tire to the ground contact surface is a reference line 42, and an imaginary line connecting between the axis of rotation of the tire and a point where the strain is calculated is a measurement line 44, the angle θ is an angle, between the reference line 42 and the measurement line 44, which is measured from the reference line 42 in the case of the direction X of rotation of the tire being set as the positive direction. The strain is calculated at points where the angle θ is between −180° and +180°.

As shown in (a) to (d) of FIG. 3, for all the points P1 to P4, the strain of the rubber is less in the tire 12 in which the absolute value α of the inclination angle is 45°, than in the tire in which the absolute value α of the inclination angle is 24°. This indicates that the deformation of the rubber of the tire 12 according to the present invention is less than the deformation of the rubber of conventional tires in the crown portion, the shoulder portion, the tread, and the topping rubber of the belt. In the tire 12 according to the present invention, the deformation of the rubber during rolling is reduced. In the tire 12 according to the present invention, the rolling resistance is reduced.

The Poisson's ratio PR of the belt 24 is preferably less than or equal to 1.9. In the tire 12 including the belt 24 in which the Poisson's ratio PR is less than or equal to 1.9, the deformation of the shoulder portion of the tread 14 during rolling is reduced. In this tire 12, the rolling resistance is reduced. In this viewpoint, the Poisson's ratio PR of the belt 24 is more preferably less than or equal to 1.6.

Meanwhile, when the absolute value α of the inclination angle increases, the stiffness of the tread in the circumferential direction decreases. Therefore, when the tire is inflated with air, the "projection" of the tread is likely to occur. This may lead to occurrence of a crack (TGC) in the groove bottom of the tread. Reduction in the occurrence of a TGC in addition to reduction in the rolling resistance is required.

The tire 12 according to the present invention includes the band 26 which is disposed radially outward of the belt 24. The band 26 includes a cord which is helically wound and extends substantially in the circumferential direction. The band 26 contributes to the stiffness of the tire 12 in the circumferential direction. The band 26 allows reduction of the projection of the tread 14. In this tire 12, the occurrence of a TGC is reduced. In this tire 12, the occurrence of a TGC is reduced while the rolling resistance is reduced.

Figure 5:
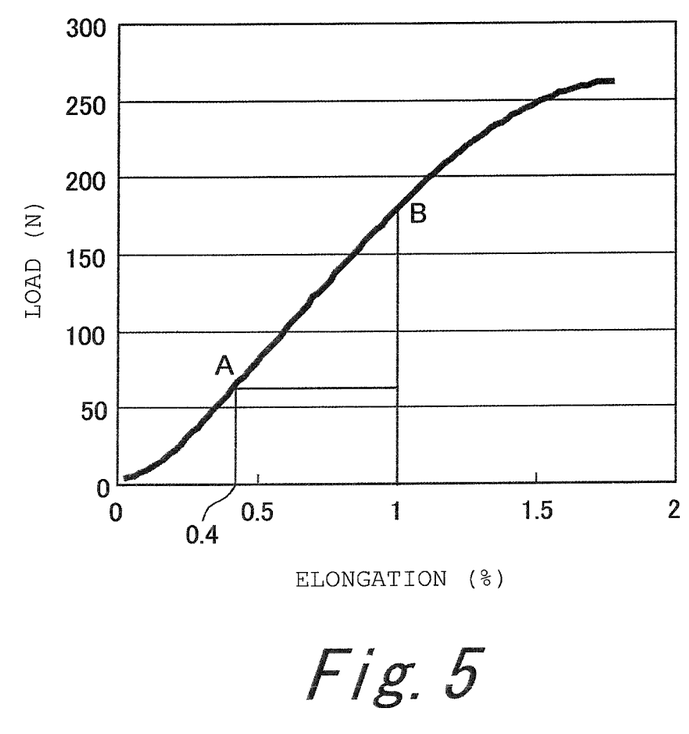
FIG. 5 is a diagram showing a relationship between an elongation of cords in a belt and a load.

As described above, the inner layer 24a and the outer layer 24b each include multiple cords aligned with each other. In this tire 12, the cords in the inner layer 24a and the cords in the outer layer 24b are of the same type. FIG. 5 shows a graph indicating, for a single cord, a relationship between a tensile strain (elongation) of the cord obtained when a tensile force is applied to the cord, and the tensile force (load) at that time. The rate of a change in the tensile force obtained when the elongation of the cord is between 0.4% and 1.0%, is referred to as the "tensile stiffness of the single cord." The "tensile stiffness of the single cord" is represented by the slope of a straight line connecting between a point A and a point B in FIG. 5.

The "density of cords" for each of the inner layer 24a and the outer layer 24b refers to the number of cords (ends) per the width of 1 mm in a cross-section perpendicular to the direction in which the cords extend. In this tire 12, the inner layer 24a and the outer layer 24b have the same cord density. A value obtained by multiplying the "tensile stiffness of the single cord" by the "cord density" represents a tensile stiffness Rt per unit width (referred to as a unit tensile stiffness Rt), in the direction in which the cord extends, of each of the inner layer 24a and the outer layer 24b. The unit tensile stiffness Rt of the inner layer 24a is equal to the unit tensile stiffness Rt of the outer layer 24b.

Conventionally, it has been considered that the higher the stiffness of the cord of the belt in the extension direction is, the less the deformation of the tread is, so that the rolling resistance of the tire is reduced. Typically, it is considered that, in conventional tires, the unit tensile stiffness Rt of the inner layer and the outer layer is about 24 kN/mm. However, according to the study by the inventors of the present invention, it has been found that the rolling resistance is reduced by reducing the unit tensile stiffness Rt. During rolling of the tire, a force is applied to the belt in the circumferential direction. The inclination angle of the cords in the inner layer and the inclination angle of the cords in the outer layer, represent values in opposite directions, respectively. Therefore, a force applied to the inner layer and a force applied the outer layer are opposite to each other in direction, resulting in a shearing force occurring between the layers in the belt. The higher the unit tensile stiffness Rt is, the higher the shearing force is. As a result, it is considered that the deformation of the tread and the topping rubber increases, so that the rolling resistance increases.

In the inner layer 24a and the outer layer 24b, the unit tensile stiffness Rt is preferably less than or equal to 20 kN/mm. In the tire 12 including the belt 24 in which the unit tensile stiffness Rt is less than or equal to 20 kN/mm, the rolling resistance may be further reduced. In this viewpoint, the unit tensile stiffness Rt is more preferably less than or equal to 19 kN/mm.

Meanwhile, when the unit tensile stiffness Rt decreases, the stiffness of the entirety of the belt decreases. Therefore, when the tire is inflated with air, the "projection" of the tread is more likely to occur. This may lead to the occurrence of a TGC. Reduction in the occurrence of a TGC in addition to reduction in the rolling resistance is required.

According to the present invention, the absolute value α of the inclination angle of the cords in the tire 12 is greater than the absolute value α of the inclination angle in conventional tires. This contributes to the stiffness in the width direction. This reduces the projection of the tread 14 in the shoulder portion. This reduces the occurrence of a TGC in the lug groove 34 of the shoulder portion. Meanwhile, in the belt having a great absolute value α, stiffness in the circumferential direction is less than in the belt having a small absolute value α. The tire 12 according to the present invention has the band 26 disposed radially outward of the belt 24. The band 26 includes a cord which is helically wound and extends substantially in the circumferential direction. The band 26 contributes to the stiffness of the tire 12 in the circumferential direction. The band 26 allows reduction of the projection of the tread 14. In this tire 12, the occurrence of a TGC is reduced. In this tire 12, the occurrence of a TGC is reduced while the rolling resistance is reduced.

For the inner layer 24a and the outer layer 24b, the unit tensile stiffness Rt is preferably not less than 15 kN/mm. In the tire 12 including the inner layer 24a and the outer layer 24b in which the unit tensile stiffness Rt is not less than 15 kN/mm, the occurrence of a TGC is effectively reduced. In this viewpoint, the unit tensile stiffness Rt is more preferably not less than 16 kN/mm.

As described above, the band 26 has a helically wound cord. The rate of a change in a tensile force obtained when, in the case of the tensile force being applied to the single cord, the elongation of the cord is between 3% and 5%, is referred to as the "tensile stiffness of the single cord." A value obtained by multiplying the "tensile stiffness of the single cord" by the "cord density" represents a tensile stiffness Rd per unit width (referred to as a unit tensile stiffness Rd) of the band 26 in the direction in which the cord extends.

The stiffness of the band affects the rolling resistance. During rolling of the tire, the tread is greatly deformed at a portion where contact of the tire with the ground is started. At this time, the band is deformed in the tensile direction, and the belt is deformed in the compression direction. When the stiffness of the band increases, a compressive force applied to the belt increases. Therefore, the deformation of the topping rubber of the belt increases. This causes increase in the rolling resistance. When the stiffness of the band increases, the deformation of the band itself is reduced, but the shear deformation of the belt increases. This affects the deformation of the tread layered over the band. In other words, there is an appropriate range for the stiffness of the band for reducing the rolling resistance of the tire. In conventional tires, the unit tensile stiffness Rd of the band is typically about 0.8 kN/mm.

The unit tensile stiffness Rd of the band 26 is preferably less than or equal to 2.5 kN/mm. In the tire 12 including the band 26 in which the unit tensile stiffness Rd is less than or equal to 2.5 kN/mm, the contribution of the topping rubber of the belt 24 and the band 26 to the rolling resistance can be decreased. The rolling resistance of the tire 12 including the band 26 is small. In this viewpoint, the unit tensile stiffness Rd is more preferably less than or equal to 2.3 kN/mm.

The unit tensile stiffness Rd of the band 26 is preferably not less than 1.6 kN/mm. In the tire 12 including the band 26 in which the unit tensile stiffness Rd is not less than 1.6 kN/mm, the contribution of the tread 14 to the rolling resistance can be decreased. The rolling resistance of the tire 12 including this band 26 is small. Moreover, in the tire 12 including this band 26, the projection of the tread 14 is reduced. In this tire 12, the occurrence of a TGC can be reduced. In this viewpoint, the unit tensile stiffness Rd is more preferably not less than 1.8 kN/mm.

In the present invention, the dimensions and angles of the components of the tire 12 are measured in a state where the tire 12 is mounted on a normal rim, and inflated with air to a normal internal pressure. During the measurement, no load is applied to the tire 12. In the description herein, the normal rim represents a rim that is specified according to the standards with which the tire 12 complies. The "standard rim" in the JATMA standards, the "design rim" in the TRA standards, and the "measuring rim" in the ETRTO standards, are included in the normal rim. In the description herein, the normal internal pressure represents an internal pressure that is specified according to the standards with which the tire 12 complies. The "maximum air pressure" in the JATMA standards, the "maximum value" recited in the "TIRE LOAD LIMITS AT VARIOUS COLD INFLATION PRESSURES" in the TRA standards, and the "inflation pressure" in the ETRTO standards, are included in the normal internal pressure. The dimensions and angles of the tire 12 for a passenger car are measured at an internal pressure of 180 kPa.

A tire according to another embodiment of the present invention will be described below.

Although not shown, a tire according to another embodiment of the present invention includes a tread, sidewalls, clinches, beads, a carcass, a belt, a band, and an inner liner. This tire is of the tubeless type. This tire is mounted to a passenger car. These components, excluding the belt, have the same structures as those of the tire in FIG. 1.

The belt is disposed radially inward of the tread. The belt is layered over the carcass. The belt reinforces the carcass. The belt includes an inner layer and an outer layer. The inner layer and the outer layer each include multiple cords aligned with each other, and a topping rubber. Each cord is inclined relative to the equator plane. The direction in which the cords in the inner layer are inclined relative to the equator plane is opposite to the direction in which the cords in the outer layer are inclined relative to the equator plane. The Poisson's ratio of this belt is less than or equal to 1.9. In this tire, a material for the cords is steel. The cords may be formed using an organic fiber. The belt may include three or more layers.

Advantageous effects of the present invention will be described below.

In this tire, the Poisson's ratio PR of the belt is less than or equal to 1.9. In the tire including the belt in which the Poisson's ratio PR is less than or equal to 1.9, the deformation of the shoulder portion of the tread during rolling is reduced. The rolling resistance of this tire is reduced. In this viewpoint, the Poisson's ratio PR is more preferably less than or equal to 1.6.

The tire according to the present invention has a band disposed radially outward of the belt. The band includes a cord which is helically wound and extends substantially in the circumferential direction. The band contributes to the stiffness of the tire in the circumferential direction. The band allows reduction of the projection of the tread. In this tire, the occurrence of a TGC is reduced. In this tire, the occurrence of a TGC is reduced while the rolling resistance is reduced.

EXAMPLES

Hereinafter, advantageous effects of the present invention will become apparent according to examples. However, the present invention should not be restrictively construed based on the description of examples.

Example 1

A tire of example 1 that had the structure shown in FIG. 1 was obtained. The tire had a size of 215/50R17 90V. The specifications of this tire are indicated in Table 1.

Comparative Example 1

A tire of comparative example 1 was obtained in the same manner as for example 1 except that the absolute value $\alpha$ of the inclination angle was 24°.

Examples 2 to 5 and Comparative Example 2

Tires of example 2 to 5 and comparative example 2 were obtained in the same manner as for example 1 except that the absolute values $\alpha$ of the inclination angles were as indicated in Table 1 and Table 2.

Examples 6 to 8

Tires of examples 6 to 8 were obtained in the same manner as for example 1 except that the unit tensile stiffness Rt for the inner layer and the outer layer was as indicated in Table 3.

Examples 9 to 12

Tires of examples 9 to 12 were obtained in the same manner as for example 7 except that the unit tensile stiffness Rd of the band was as indicated in Table 4.

[Rolling Resistance]

The rolling resistance was measured using a rolling resistance testing machine under the following measurement conditions.

Rim used: 6.6 J×17
Internal pressure: 250 kPa
Load: 4.8 kN
Speed: 80 km/h
Break-in time: forward 30 min; backward 15 min
Room temperature: 20°

The results are indicated in Tables 1 to 4 and are represented by index numbers, where the value of comparative example 1 is 100. The less the value is, the less the rolling resistance is and the better fuel efficiency is. The less the numerical value is, the better the evaluation is.

[TGC Resistance Performance]

A sample tire was mounted on a standard rim (size=6.6 J×17). The internal pressure of the tire was 250 kPa. A cut having a depth of 2 mm and a length of 8 mm was made in a main groove and a lug groove of the tire by using a razor blade. The shape of the cut portion was taken, and a width of the opening of the cut portion was measured. The results are indicated in Tables 1 to 4 and are represented by index numbers, where the value of comparative example 1 is 100. The less the opening width of the cut portion is, the higher the TGC resistance performance is. The less the numerical value is, the better the evaluation is.

TABLE 1

| Evaluation results | | | | |
|---|---|---|---|---|
| | Comparative example 1 | Example 2 | Example 3 | Example 1 |
| Absolute value α [°] of inclination angle | 24 | 35 | 38 | 45 |
| Unit tensile stiffness Rt [kN/mm] | 24.3 | 24.3 | 24.3 | 24.3 |
| Unit tensile stiffness Rd [kN/mm] | 0.83 | 0.83 | 0.83 | 0.83 |
| Poisson's ratio PR | 4.4 | 1.9 | 1.6 | 1.0 |
| Rolling resistance | 100 | 97 | 97 | 96 |
| TGC resistance performance | 100 | 102 | 103 | 103 |

TABLE 2

| Evaluation results | | | |
|---|---|---|---|
| | Example 4 | Example 5 | Comparative example 2 |
| Absolute value α [°] of inclination angle | 52 | 55 | 60 |
| Unit tensile stiffness Rt [kN/mm] | 24.3 | 24.3 | 24.3 |
| Unit tensile stiffness Rd [kN/mm] | 0.83 | 0.83 | 0.83 |
| Poisson's ratio PR | 0.6 | 0.5 | 0.3 |
| Rolling resistance | 96 | 96 | 95 |
| TGC resistance performance | 104 | 104 | 106 |

TABLE 3

| Evaluation results | | | |
|---|---|---|---|
| | Example 6 | Example 7 | Example 8 |
| Absolute value α [°] of inclination angle | 45 | 45 | 45 |
| Unit tensile stiffness Rt [kN/mm] | 19.7 | 16.5 | 13.2 |
| Unit tensile stiffness Rd [kN/mm] | 0.83 | 0.83 | 0.83 |
| Poisson's ratio PR | 1.0 | 1.0 | 1.0 |
| Rolling resistance | 96 | 96 | 96 |
| TGC resistance performance | 103 | 103 | 103 |

TABLE 4

| Evaluation results | | | | |
|---|---|---|---|---|
| | Example 9 | Example 10 | Example 11 | Example 12 |
| Absolute value α [°] of inclination angle | 45 | 45 | 45 | 45 |
| Unit tensile stiffness Rt [kN/mm] | 16.5 | 16.5 | 16.5 | 16.5 |
| Unit tensile stiffness Rd [kN/mm] | 1.64 | 2.24 | 2.50 | 3.09 |
| Poisson's ratio PR | 1.0 | 1.0 | 1.0 | 1.0 |
| Rolling resistance | 96 | 96 | 95 | 95 |

TABLE 4-continued

| Evaluation results | | | | |
|---|---|---|---|---|
| | Example 9 | Example 10 | Example 11 | Example 12 |
| TGC resistance performance | 103 | 103 | 101 | 101 |

As indicated in Tables 1 to 4, in the tire according to the present invention, the rolling resistance is reduced, and at the same time, the degradation of the TGC resistance performance is reduced. The evaluation results clearly indicate that the present invention is superior.

INDUSTRIAL APPLICABILITY

The tire according to the present invention can be mounted to various vehicles.

DESCRIPTION OF THE REFERENCE CHARACTERS 2, 24 . . . belt
4, 24a . . . inner layer
6, 24b . . . outer layer
8 . . . cord
10 . . . topping rubber
12 . . . tire
14 . . . tread
16 . . . sidewall
18 . . . clinch
20 . . . bead
22 . . . carcass
26 . . . band
28 . . . inner liner
30 . . . tread surface
32 . . . main groove
34 . . . lug groove
36 . . . core
38 . . . apex
40 . . . carcass ply
42 . . . reference line
44 . . . measurement line

The invention claimed is:
1. A pneumatic tire comprising:
a tread having an outer surface that forms a tread surface;
a band disposed radially inward of the tread; and
a belt disposed radially inward of the band, wherein
the band includes a cord that is helically wound and extends substantially in a circumferential direction,
the belt includes an inner layer, and an outer layer that is layered over the inner layer and disposed radially outward of the inner layer,
the inner layer and the outer layer each include multiple cords aligned with each other,
the cords in the inner layer and the cords in the outer layer are inclined relative to an equator plane,
a direction in which the cords in the inner layer are inclined relative to the equator plane is opposite to a direction in which the cords in the outer layer are inclined relative to the equator plane,
absolute values of inclination angles of the cords in the inner layer and the cords in the outer layer relative to the equator plane are greater than or equal to 35°, and not greater than 55°, a tensile stiffness Rt per unit width of each of the inner layer and the outer layer in a direction in which the cords extend is measured when a tensile strain in the cords in the inner layer and the outer layer is between 0.4% and 1.0%, and the tensile stiffness Rt is greater than or equal to 14 kN/mm, and not greater than 20 kN/mm, and a tensile stiffness Rd per unit width of the band in a direction in which the cord extends is measured when a tensile strain in the cord of the band is between 3% and 5%, and the tensile stiffness Rd is greater than or equal to 2.50 kN/mm, and not greater than 3.09 kN/mm.

2. The tire according to claim 1, wherein the belt has a Poisson's ratio that is less than or equal to 1.9.

3. A pneumatic tire comprising:

a tread having an outer surface that forms a tread surface;

a band disposed radially inward of the tread; and a belt disposed radially inward of the band, wherein the band includes a cord that is helically wound and extends substantially in a circumferential direction, the belt includes an inner layer, and an outer layer that is layered over the inner layer and disposed radially outward of the inner layer, the inner layer and the outer layer each include multiple cords aligned with each other, the cords in the inner layer and the cords in the outer layer are inclined relative to an equator plane, a direction in which the cords in the inner layer are inclined relative to the equator plane is opposite to a direction in which the cords in the outer layer are inclined relative to the equator plane, and the belt has a Poisson's ratio that is less than or equal to 1.9, a tensile stiffness Rt per unit width of each of the inner layer and the outer layer in a direction in which the cords extend is measured when a tensile strain in the cords in the inner layer and the outer layer is between 0.4% and 1.0%, and the tensile stiffness Rt is greater than or equal to 14 kN/mm, and not greater than 20 kN/mm, and wherein a tensile stiffness Rd per unit width of the band in a direction in which the cord extends is measured when a tensile strain in the cord of the band is between 3% and 5%, and the tensile stiffness Rd is greater than or equal to 2.50 kN/mm, and not greater than 3.09 kN/mm.

\* \* \* \* \*